United States Patent [19]
Henry et al.

[11] Patent Number: 5,206,636
[45] Date of Patent: Apr. 27, 1993

[54] SIGNAL SEARCH METHOD FOR SELECTIVE CALL RECEIVER

[75] Inventors: Courtney S. Henry, Coconut Creek; Gregory O. Snowden, Boca Raton; Thomas E. Holmes, Boynton Beach, all of Fla.

[73] Assignee: Motorola, Inc., Schaumburg, Ill.

[21] Appl. No.: 635,384

[22] Filed: Jan. 7, 1991

Related U.S. Application Data

[63] Continuation of Ser. No. 426,388, Oct. 25, 1989, abandoned.

[51] Int. Cl.$^5$ .................................................. H04B 7/00
[52] U.S. Cl. .......................... 340/825.52; 340/825.44
[58] Field of Search ................. 340/825.52, 825.44, 340/825.47, 825.64, 825.65, 825.57, 825.69; 455/343, 228; 375/76, 97

[56] References Cited

U.S. PATENT DOCUMENTS

| | | | |
|---|---|---|---|
| 3,579,190 | 5/1971 | Karras | 340/825.64 |
| 4,413,261 | 11/1983 | Greenberg | 340/825.72 |
| 4,506,262 | 3/1985 | Vance et al. | 340/825.44 |
| 4,523,332 | 6/1985 | Mori | 455/228 |
| 4,554,665 | 11/1985 | Beesley | 371/55 |
| 4,642,632 | 2/1987 | Ohyagi et al. | 340/825.44 |
| 4,652,875 | 3/1987 | Waki | 340/825.44 |

*Primary Examiner*—Sandra L. O'Shea
*Assistant Examiner*—Dervis Magistre
*Attorney, Agent, or Firm*—William E. Koch; Thomas G. Berry

[57] ABSTRACT

A method of rejecting undesired signals in a selective call receiver operating in a POCSAG system comprises normalizing and counting data transitions that occur at a baud rate less than a predetermined baud rate, comparing the counted number to the total number of transitions, and using this information as criteria for extending the selective call receiver "on" time in a signal search mode.

18 Claims, 4 Drawing Sheets

FIG.1 —PRIOR ART—

SIGNAL SEARCH METHOD FOR SELECTIVE CALL RECEIVER

This application is a continuation of application Ser. No. 07/426,388, filed Oct. 25, 1989, now abandoned.

FIELD OF THE INVENTION

This invention relates in general to selective call receivers such as pagers and, more specifically, to a method of processing received signals therein.

BACKGROUND OF THE INVENTION

Selective call receivers such as pagers typically operate by receiving paging signals comprised of radio frequency signals modulated by digital data in a predetermined format, sent from a paging terminal and transmitter. A paging system is comprised of a plurality of such pagers, all operating on the same radio frequency and all with the same digital format, and a paging terminal and transmitter, generating and sending paging signals with the proper digital format and radio frequency.

Since most pagers within a system are battery-operated, battery-saving techniques are usually employed in order to maximize the life of the battery. These battery-saving techniques typically comprise activating the radio frequency receiver section within each pager only during times when it is known that a page might be received. Each pager in a system periodically strobes its radio frequency section "on" to check for the presence of paging signals at the proper radio frequency and modulated with the appropriate digital format. If such a signal is detected by a pager, the radio frequency section within the pager is held "on" for an extended period of time to enable the pager to receive any pages that might be destined for it.

In some paging systems, there is, on a specific single radio frequency, a mixture of pagers with various digital formats. This requires the paging terminal in these systems to alternate the digital format with which the sent radio frequency signals are modulated. In some pagers in the system, this requirement can cause a problem of the radio frequency section being held "on" for a signal with a digital format other than the proper one. This phenomena is known as "falsing." The falsing phenomena is known to be especially prevalent in paging systems that mix the Golay Sequential Coding (GSC) and Post Office Code Standardisation Advisory Group (POCSAG) codes.

The GSC code comprises a single digital format that operates at two data rates, 300 baud and 600 baud. The POCSAG code comprises two separate and distinct digital formats, one of which operates at 512 baud, the other of which operates at 1200 baud. The incompatibility between the GSC and POCSAG formats results from the fourth harmonic of 300 baud GSC and the second harmonic of 600 baud GSC being recognized as a legitimate signal on 1200 baud POCSAG pagers. As a consequence, 1200 baud POCSAG pagers can recognize extraneous 300 baud or 600 baud GSC signals as the proper digital format and, therefore, unnecessarily extend the "on" time of the radio frequency section of the receiver, thereby degrading battery life. Similarly, the 600 baud GSC signal or the second harmonic of the 300 baud GSC signal can be recognized as the proper format on a 512 baud POCSAG pager.

A known method in the current art for preventing POCSAG pagers from falsing on GSC signals comprises the Beesley method. In the Beesley method, a decision is made whether to extend the radio frequency section "on" time based upon a sample of the incoming digital data performed over a predetermined number of transitions, where a transition comprises a change in the incoming data from a zero to a one or vice versa. If the elapsed time between any pair of sampled adjacent transitions is greater than 1.5 bit-times (at the desired baud rate), the elapsed time between those two adjacent transitions is normalized down in increments of one bit-time until it is less than or equal to 1.5 bit-times. Sampled pairs of adjacent transitions that are less than or equal to 1.5 bit-times apart are not normalized. At the end of the data sample, the result is a predetermined number of samples that are between 0 and 1.5 bit-times. These samples are then averaged in order to calculate an estimated baud rate and, if the estimated baud rate is within preset limits relative to the desired baud rate, the radio frequency section is left "on" for an extended period of time. The preset limits relative to the desired baud rate are typically predetermined and are stored in the memory of the pager.

The principle shortcoming of the Beesley method is its inability to reject extraneous signals that are integral multiples of the desired baud rate. For example, if a 600 baud one/zero pattern is present in a 1200 baud POCSAG Beesley system, each adjacent pair of transitions will be two bit-times apart at 1200 baud (1200/600=2). The sample, then, between each pair of adjacent transitions will be normalized down one bit-time to be equal to one bit-time (2−1=1). Therefore, after the predetermined number of transitions, the averaged value of the samples will be 1 bit-time and, therefore, it will appear that a 1200 baud signal is being sent. The radio frequency section of the pager will then be left "on" for an extended period of time unnecessarily, thereby degrading the battery life of the pager.

An additional shortcoming of the Beesley method is the inflexibility of the preset limits relative to the desired baud rate. Depending on the exact mixture of data rates and formats being sent by the transmitter, this inflexibility can result in an undesirable level of falsing.

Thus, what is needed is an improved method of rejecting extraneous signals in a paging system, particularly in systems that use both the GSC and POCSAG formats.

SUMMARY OF THE INVENTION

Accordingly, it is an object of the present invention to provide an improved method of rejecting extraneous signals in a selective call receiver system.

In carrying out the above and other objects of the invention in one form, there is provided a method in an electronic device capable of receiving signals including data, the data comprising transitions occurring at a first predetermined rate, the method comprising the steps of: measuring the number of the transitions that occur at a rate less than a second predetermined rate; comparing the measured number to the total number of the transitions after a predetermined number of the transitions; and making a decision based upon the comparison.

DETAILED DESCRIPTION OF THE INVENTION

Figure 1:
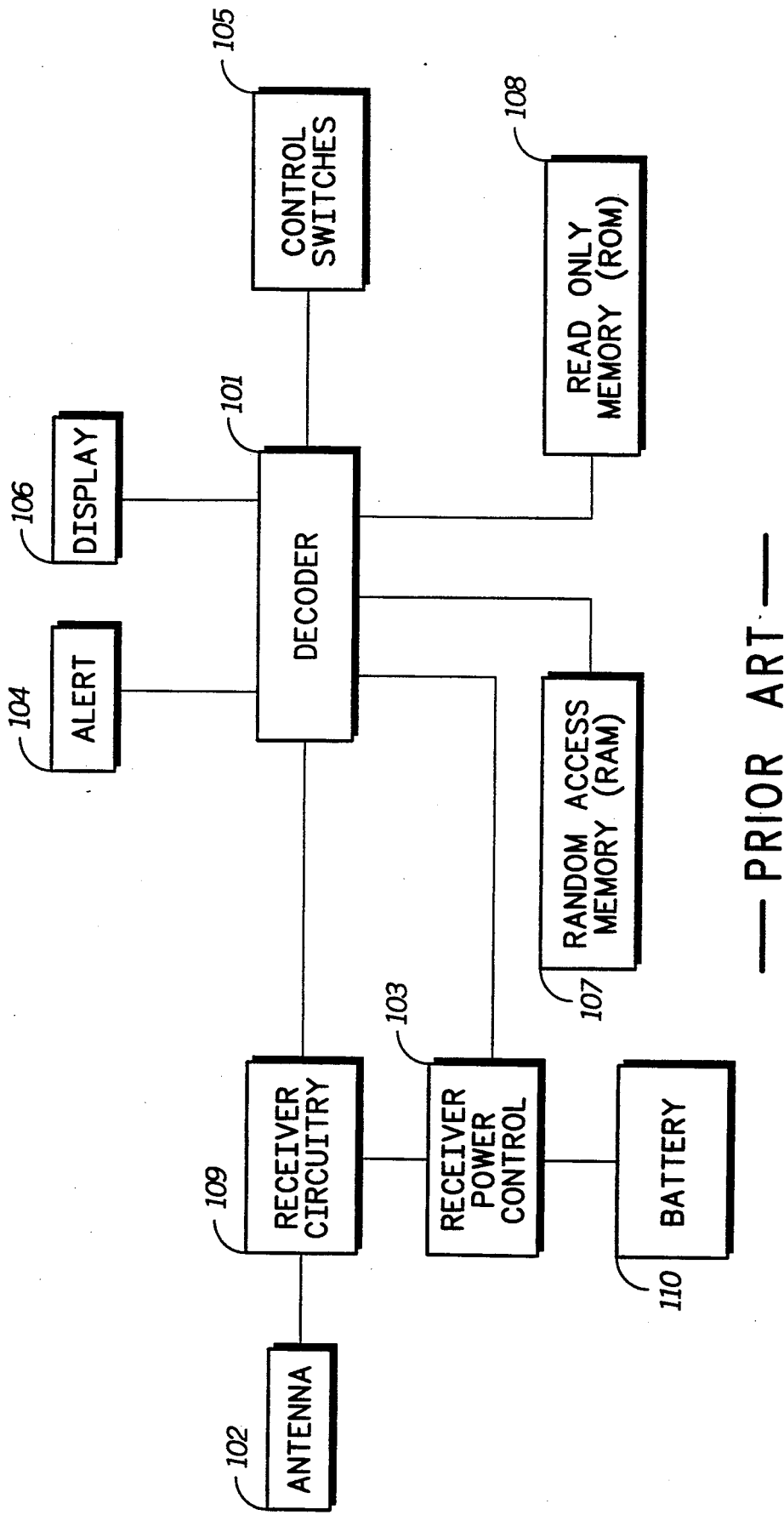
FIG. 1 is a block diagram of a known selective call receiver.

Referring to FIG. 1, a known electronic device for performing first and second embodiments of the present invention comprises a selective call receiver such as a pager comprising an antenna 102 for receiving radio frequency signals modulated by digital data. In normal operation, the pager operates in a mode known as the signal-search mode in which the decoder 101 periodically "turns on" the receiver circuitry 109 through the receiver power control 103 and the battery 110, permitting the conduction of the received radio frequency signals from the antenna 102 to the receiver circuitry 109, where the digital data modulation is recovered from the radio frequency signal.

The time duration of each receiver circuitry 109 "on" period typically comprises the time required to obtain a given number of data transitions in the received, demodulated data signal, where a data transition is a change in the data signal from a zero to a one or vice versa. The given number of data transitions may be 32, 64, or another number. The recovered digital data is then input from the receiver circuitry 109 to the decoder 101, where the data is checked to determine if it is occurring at a first predetermined rate known as the system baud rate which is predetermined according to system requirements. The system baud rate could be, for example, a POCSAG system rate such as 512 baud or 1200 baud, or a different rate.

If it is determined by the decoder 101 that a legitimate signal is being received relative to the system baud rate, the decoder 101 holds the receiver circuitry "on" for an extended period of time to permit receipt of the portion of the incoming digital data that may comprise receiver addresses and messages. Any receiver address thus received is compared to those receiver addresses stored within the read only memory (ROM) 108. If there is a match between the received address and any of the stored addresses, any message associated with the address, for example, numeric or alphanumeric, is stored in the random access memory (RAM) 107, the alert 104 is activated to inform the selective call receiver user of the received message, and the received message may then be displayed on the display 106 by actuation of the control switches 105.

In the present invention, the decision whether to extend the receiver circuitry 109 "on" time in the signal search mode is based upon two criteria. The first criteria involves, during each receiver circuitry 109 "on"-'period of the signal search mode, a measurement to count every pair of data transitions that occur at a rate less than a second predetermined rate, where the second predetermined rate may be less than the aforementioned first predetermined data rate and the relationship between the first predetermined rate (FPR) and the second predetermined rate (SPR) may be described by: FPR=(1.5)SPR. Stated in terms of time, one bit-time at the SPR is 1.5 times one bit-time at the FPR. The receiver circuitry 109 "on" time in the signal search mode comprises the time necessary to obtain a predetermined number of transitions. For each pair of transitions that occur at a rate less than the second predetermined rate, a normalization is performed. The normalization step comprises the iterative subtraction of one bit-time (at the system data rate) from the time between the pair of transitions until the rate between them is equal to or greater than the second predetermined rate. This step may comprise iteratively subtracting one bit-time from the time between each pair of transitions that are more than 1.5 bit-times apart (at the system data rate) until the time between the transitions is equal to or less than 1.5 bit-times. The result of this process is a predetermined number of data samples that are each equal to or less than 1.5 bit-times in length. As the number of performed normalizations is measured, the number is counted by means that may comprise a software counter within the RAM 107. The counter is incremented once only for each pair of transitions that occur at a rate less than the second predetermined rate, regardless of how low the rate is. At the end of the signal search "on" time, that is, after the predetermined number of transitions have occurred, the measured number of normalizations is compared to a first predetermined number. In a 1200 baud POCSAG system, a typical criteria for deciding that 1200 baud POCSAG is probably not on the air and, therefore, the receiver circuitry 109 "on" time should not be extended, comprises at least 28 normalizations in a 32 transition sample. This criteria, however, could comprise a different number of normalizations and transitions. The chosen numbers may be derived through a combination of the application of probability theory and empirical experimentation.

The second criteria for deciding whether to extend the "on" time of the receiver circuitry 109 in the signal-search mode involves application of the Beesley method, that is, averaging the predetermined number of data samples between 0 and 1.5 bit-times in length, obtained above, to derive an estimated baud rate of the incoming data, which is compared to preset limits relative to the desired baud rate. The preset limits relative to the desired baud rate are typically predetermined and may reside in the RAM 107 or the ROM 108.

In a second embodiment of the invention, the selected baud rate bandwidth may be automatically adjusted for each signal search mode "on" period based upon the aforedescribed first criteria, that is, the number of normalizations performed during receipt of the data. The decision criteria for both the first and second embodiments are described in greater detail in the following descriptions of FIG. 3 and FIG. 4.

Figure 2:
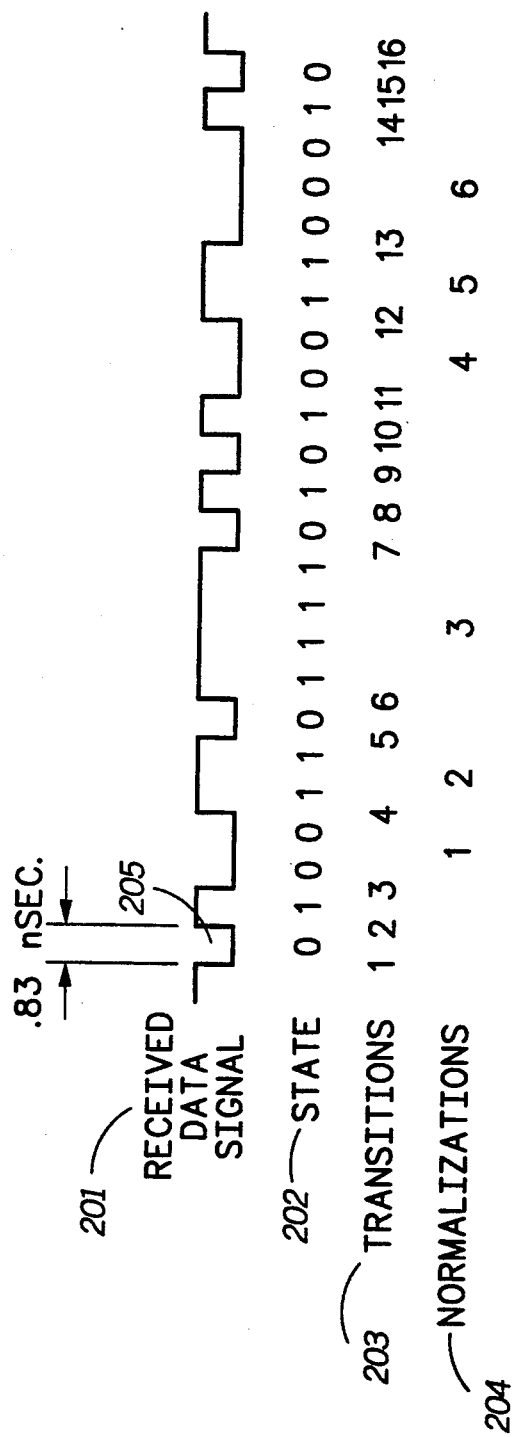
FIG. 2 is a timing diagram illustrating first and second embodiments.

Referring to FIG. 2, a timing diagram illustrating the method of the first and second embodiments comprises a received data signal 201. The system data rate for the purposes of FIG. 2 is assumed to be 1200 baud, although it could be another rate. Accordingly, a typical single bit 205 is 1/1200=0.83 milliseconds in width. The state row 202 indicates the state of each individual bit in the data signal. The transition row 203 shows a cumulative count of each transition in the data signal. As the transition row 203 shows, the portion of the data signal 201 that is shown comprises 16 transitions. As described in the foregoing, the data is typically sampled in the signal search mode for 32 or 64 transitions, the value of 16 transitions is chosen here, however, for the sake of simplicity. The normalization row 204 shows a cumulative count of each normalization that would be performed per the foregoing description, that is, a normalization is performed for each pair of adjacent transitions that are greater than 1.5 bits apart relative to the system data rate. The normalization count is then used as a criteria for deciding whether or not to extend the "on"

time of the receiver. There is a total of six normalizations after 16 transitions for the example data signal shown in FIG. 2.

Figure 3:
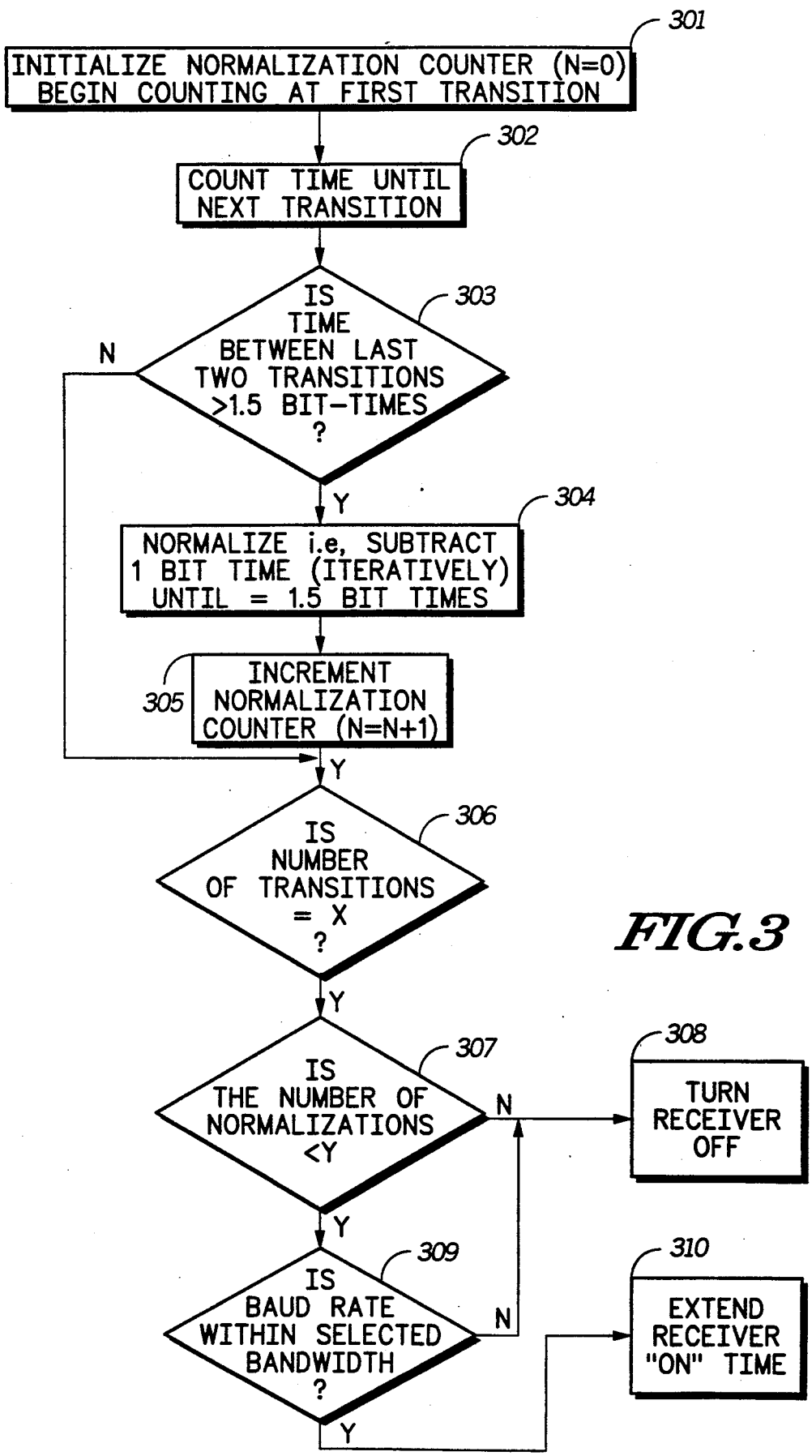
FIG. 3 is a flow diagram of the process of the first embodiment.

Referring to FIG. 3, a flow chart of the first embodiment of the invention comprises the initialization of a normalization counter, that is, setting the counter N=0, and beginning a time count at the first data transition, step 301. In step 302, the time is counted until the next transition, then, in step 303, if the time between the last two transitions is not greater than 1.5 bit-times (at the system data rate), the process proceeds directly to step 306. If, in step 303, the time between the last two transitions is greater than 1.5 bit-times, the process proceeds to step 304 in which a normalization is performed, in other words, one bit-time is subtracted iteratively from the time between the last two transitions until the time between the last two transitions is less than or equal to 1.5 bit-times. The process then proceeds to step 305 in which the normalization counter is incremented by one, that is, N=N+1. In step 306, if the number of transitions is not equal to a predetermined number X, the process returns to step 302. If the number of transitions is equal to the predetermined number X, and if the number of normalizations is not less than a predetermined number Y, the decoder 101 sends a signal to the receiver power control 103, resulting in the turning off of the receiver circuitry 109, step 308. If, in step 307, the number of normalizations is less than the predetermined number Y, a check is made to see if the baud rate of the received signal is within a selected bandwidth, step 309. The selected bandwidth may be predetermined and may reside in the RAM 107 or in the ROM 108. If, in step 309, the baud rate of the received signal is not within the selected bandwidth, the receiver circuitry 109 is turned off, step 308. If, in step 309, the baud rate of the received signal is within the selected bandwidth, the "on" time of the receiver circuitry 109 is extended through a control signal sent by the decoder 101 to the receiver power control 103, step 310.

Figure 4:
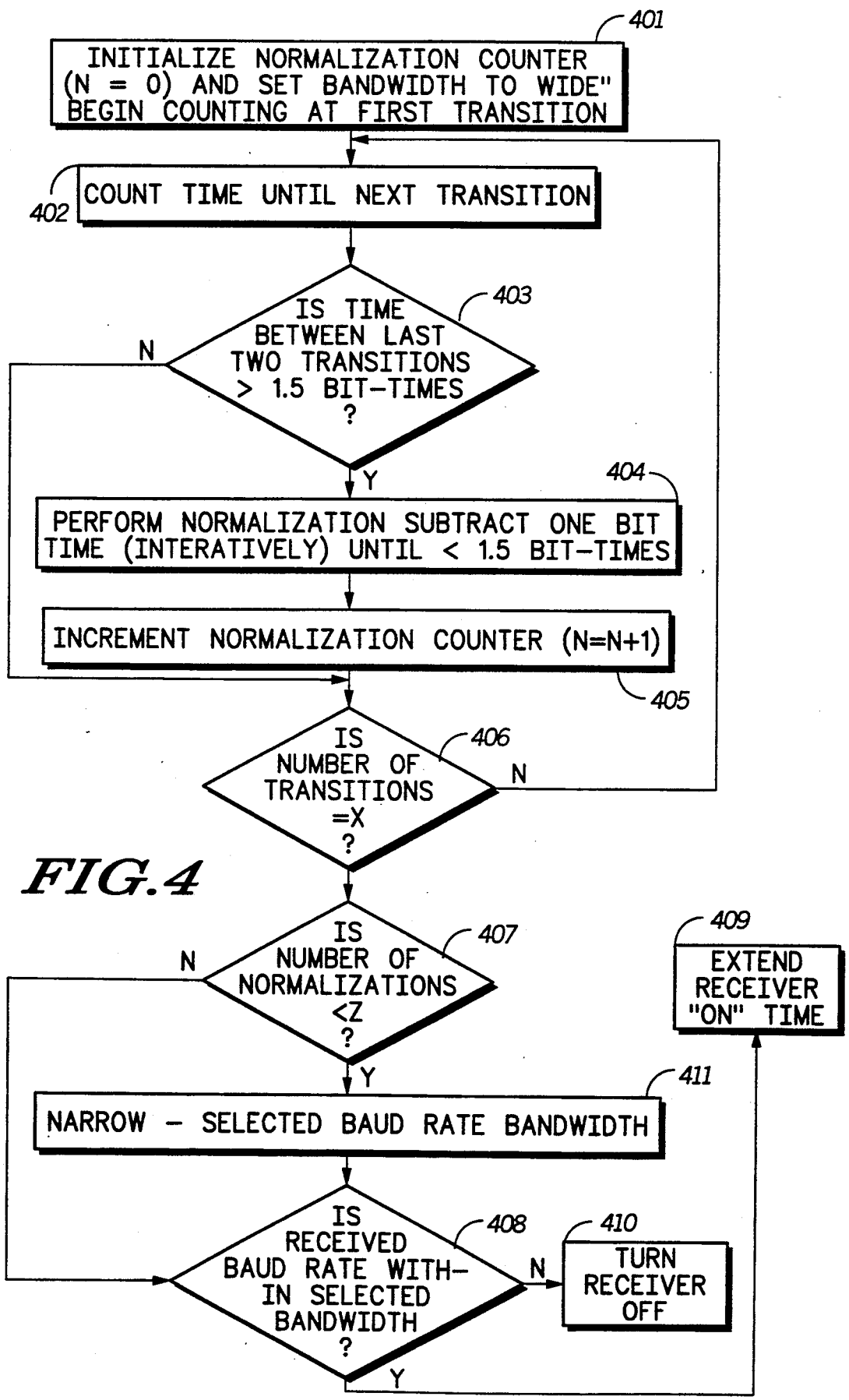
FIG. 4 is a flow diagram of the process of the second embodiment.

Referring to FIG. 4, a second embodiment of the invention comprises the initialization of a normalization counter, that is, setting the counter N=0, setting the selected baud rate bandwidth to a predetermined "wide" setting which may reside in the RAM 107 or the ROM 108, and beginning a time count at the first data transition, step 401. In step 402, the time is counted until the next transition, then, in step 403, if the time between the last two transitions is not greater than 1.5 bit-times (at the system data rate), the process proceeds directly to step 406. If, in step 403, the time between the last two transitions is greater than 1.5 bit-times, the process proceeds to step 404 in which a normalization is performed, in other words, one bit-time is subtracted iteratively from the time between the last two transitions until the time between the last two transitions is less than or equal to 1.5 bit-times. The process then proceeds to step 405 in which the normalization counter is incremented by one, that is, N=N+1. In step 406, if the number of transitions is not equal to a predetermined number X, the process returns to step 402. In step 406, if the number of transitions is equal to the predetermined number X, the process proceeds to step 407.

If, in step 407, the number of normalizations is less than a predetermined number Z, the process proceeds to step 408, in which a check is made to see if the baud rate of the received signal is within the aforedescribed "wide" selected baud rate bandwidth setting, step 408. If, in step 408, the baud rate of the received signal is found not to be within the "wide" bandwidth, the receiver circuitry 109 is turned off through a control signal from the decoder 101 to the receiver power control 103, step 410. If, in step 408, the baud rate of the received signal is within the "wide" bandwidth, the "on" time of the receiver circuitry 109 is extended through a control signal sent by the decoder 101 to the receiver power control 103, step 409.

Referring back to step 407, if the number of normalizations is found to not be less than the predetermined number Z, the selected baud rate bandwidth is adjusted to a predetermined narrower range, step 411, and the process proceeds to step 408.

We claim:

1. A method in an electronic device capable of receiving signals having transitions between first and second states and including data as determined by said first and second states, said method comprising the steps of:
   measuring the time between adjacent ones of each of said transitions for a predetermined number of transitions;
   counting the number of measured times having a magnitude greater than a predetermined time; and
   making a decision based on the number of counted measured times.

2. The method according to claim 1 wherein said electronic device comprises a selective call receiver.

3. The method according to claim 1 wherein said signals comprise radio frequency carrier signals modulated by said transitions.

4. The method according to claim 1 wherein said predetermined relationship comprises the measured time being one and one half times greater than the predetermined time.

5. The method according to claim 1 wherein said decision step comprises enabling a circuit.

6. The method according to claim 5 wherein said circuit comprises a radio frequency receiver.

7. The method according to claim 1 wherein said electronic device comprises a radio frequency receiver, said predetermined number of said transitions substantially comprises 32, and comprises enabling said radio frequency receiver when said counted measured times is less than 28.

8. The method according to claim 1 wherein said signals comprise radio frequency signals modulated by POCSAG signals.

9. The method according to claim 1 wherein the making step comprises the step of:
   adjusting the bandwidth of a receiver based upon said plurality of data transitions.

10. An apparatus capable of receiving signals having transitions between first and second states and including data as determined by said first and second states, comprising:
    first means for receiving said data;
    second means for measuring the time between adjacent ones of each of said transitions for a predetermined number of transitions;
    third means for counting the number of measured times having a magnitude greater than a predetermined time; and
    fourth means for making a decision based on the number of counted measured times.

11. The apparatus according to claim 10 wherein said apparatus comprises a selective call receiver and said signals comprise a radio frequency signal modulated by said data transitions.

12. The method according to claim 10 wherein said predetermined relationship comprises the measured time being one and one half times greater than the predetermined time.

13. The apparatus according to claim 10 wherein said decision comprises enabling a circuit.

14. The apparatus according to claim 10 wherein said circuit comprises a radio frequency receiver.

15. The method according to claim 9 wherein said electronic device comprises a selective call receiver and said signals comprise radio frequency signals modulated by said data transitions.

16. The method according to claim 9 wherein said signals comprise radio frequency signals modulated by POCSAG signals and said bandwidth includes a rate of 512 bits per second.

17. A method for reducing power consumption in a selective call receiver capable of receiving signals having transitions between first and second states and including data as determined by said first and second states, wherein only a first portion of said selective call receiver is initially powered, said method comprising the steps of:

measuring the time between adjacent ones of each of said transitions for a predetermined number of transitions;

normalizing the measured times having a predetermined relationship with a predetermined time;

counting the number of normalizations; and determining whether to extend power to additional portions of said selective call receiver based on the number of counted normalizations.

18. A selective call receiver having reduced power consumption, capable of receiving signals having transitions between first and second states and including data as determined by said first and second states, comprising:

first means for receiving said data;

second means for measuring the time between adjacent ones of each of said transitions for a predetermined number of transitions;

third means for normalizing the measured times having a predetermined relationship with a predetermined time;

fourth means for counting the number of normalizations; and fifth means for determining whether to decode the received signal based on the number of counted normalizations.

* * * * *